(12) United States Patent
Duparré et al.

(10) Patent No.: US 8,792,190 B2
(45) Date of Patent: Jul. 29, 2014

(54) LENS AND METHOD FOR MANUFACTURING SAME

(75) Inventors: Jacques Duparré, Jena (DE); Steven Oliver, San Jose, CA (US)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 13/267,021

(22) Filed: Oct. 6, 2011

(65) Prior Publication Data

US 2012/0140340 A1 Jun. 7, 2012

Related U.S. Application Data

(63) Continuation of application No. PCT/EP2009/003929, filed on Jun. 2, 2009.

(51) Int. Cl.
*G02B 7/02* (2006.01)
*G03B 21/60* (2014.01)
*G02B 27/10* (2006.01)

(52) U.S. Cl.
USPC .................. 359/811; 359/455; 359/619

(58) Field of Classification Search
USPC .......... 359/459, 665–667, 454–455, 821–823, 359/618–621, 625–626; 264/1.1, 1.32, 2.7; 216/26; 430/231
See application file for complete search history.

(56) References Cited

U.S. PATENT DOCUMENTS

| 7,223,619 B2 | 5/2007 | Wang et al. | |
|---|---|---|---|
| 7,564,496 B2 | 7/2009 | Wolterink et al. | |
| 2002/0153960 A1 | 10/2002 | Ichimaru | |
| 2005/0061950 A1 | 3/2005 | Jiang et al. | |
| 2008/0198481 A1* | 8/2008 | Zung et al. | 359/716 |
| 2008/0290435 A1 | 11/2008 | Oliver et al. | |
| 2009/0246546 A1 | 10/2009 | Keppner et al. | |
| 2010/0177411 A1* | 7/2010 | Hegde et al. | 359/823 |
| 2012/0081801 A1* | 4/2012 | Duparre et al. | 359/811 |

FOREIGN PATENT DOCUMENTS

| JP | 63-037309 A | 2/1988 |
|---|---|---|
| JP | 05-066302 A | 3/1993 |
| JP | 2002-341108 A | 11/2002 |
| JP | 2004-198536 A | 7/2004 |
| JP | 2005-252257 A | 9/2005 |
| JP | 2005-352345 A | 12/2005 |
| JP | 2005-539276 A | 12/2005 |
| JP | 2008-524643 A | 7/2008 |
| JP | 2009-018578 A | 1/2009 |

(Continued)

OTHER PUBLICATIONS

Duparre et al., "Lens and Method for Manufacturing Same," U.S. Appl. No. 13/267,015, filed Oct. 6, 2011.
Official Communication issued in corresponding Japanese Patent Application No. 2012-513474, mailed on Aug. 6, 2013.
Official Communication issued in corresponding Japanese Patent Application No. 2012-513475, mailed on Sep. 3, 2013.

(Continued)

*Primary Examiner* — James Greece
*Assistant Examiner* — Sharrief Broome
(74) *Attorney, Agent, or Firm* — Keating & Bennett, LLP

(57) ABSTRACT

In a method for manufacturing a lens, a substrate which has a recess in a first surface thereof is provided. A sacrificial material is provided in the recess which has shape in accordance with a first desired lens surface. A lens material is applied to the substrate and to the sacrificial material and cured so that the lens material has a shape in accordance with the first desired lens surface, and then the sacrificial material is removed.

12 Claims, 14 Drawing Sheets

(56) References Cited

FOREIGN PATENT DOCUMENTS

| | | | |
|---|---|---|---|
| JP | 2010-501890 A | 1/2010 | |
| WO | 2004/059348 A2 | 7/2004 | |
| WO | 2008/024071 A1 | 2/2008 | |
| WO | WO 2008123589 A1 * | 10/2008 | .............. B29C 43/02 |

OTHER PUBLICATIONS

Official Communication issued in corresponding International Patent Application No. PCT/EP2009/003929, mailed on Mar. 2, 2010.
Official Communication issued in corresponding International Patent Application No. PCT/EP2009/003929, mailed on Sep. 12, 2011.

* cited by examiner

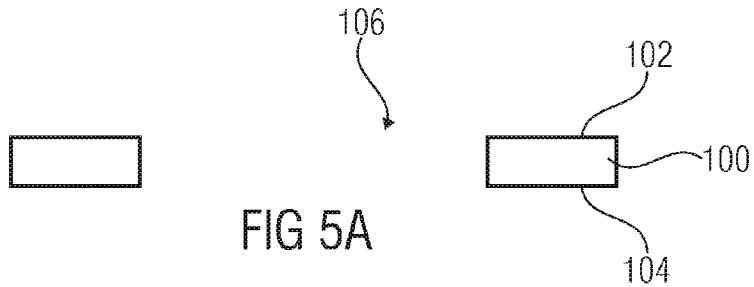
FIG 5A
FIG 5B
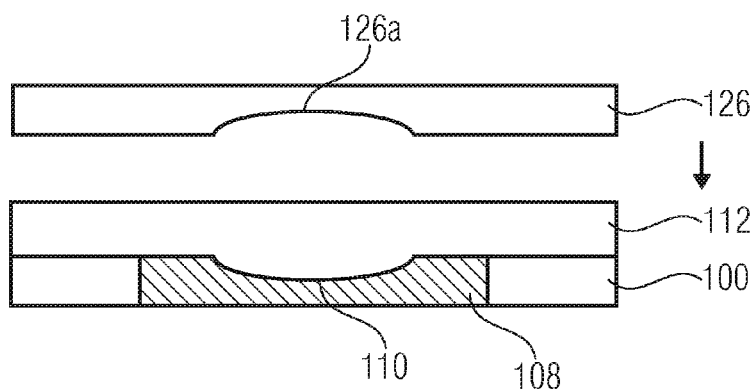
FIG 5C
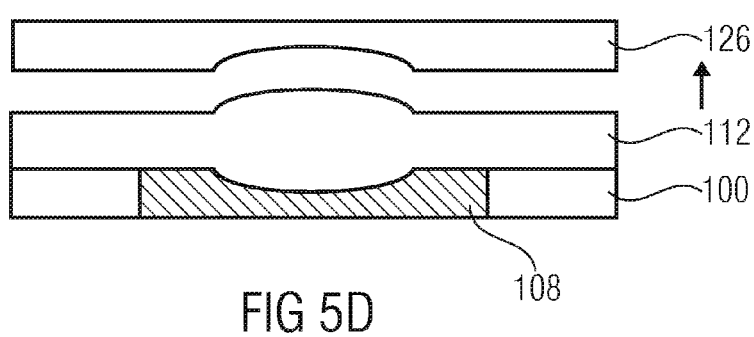
FIG 5D
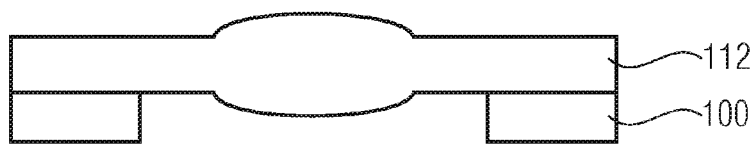
FIG 5E

LENS AND METHOD FOR MANUFACTURING SAME

Embodiments of the invention concern the field of optical systems, more specifically the field of lenses and manufacturing such lenses. Embodiments of the invention relate to wafer scale optics, more specifically to wafer scale lens designs that may be used in lens arrangements or optical systems, e.g. in digital cameras in mobile phones, personal digital assistants and the like, especially in combination with CMOS image sensors.

BACKGROUND OF THE INVENTION

In the field of wafer scale optics lenses are manufactured by providing a UV curable polymer material onto a thick glass substrate and shaping the polymer material into a desired lens form. The polymer may be deposited either on one side or on both sides of the glass substrate. A plurality of such lens wafers are stacked on each other, either directly or by means of one or more spacer wafers which may be glass or polymer substrates comprising holes. Thus, the respective lenses are arranged with a distance to the imaging plane. Then, the wafer is diced and the respective optics are mounted to an imaging sensor.

This approach is disadvantageous as for mechanical and structural reasons the amount of high refractive index material, i.e. materials having a refractive index n of about 1.5 vs. n=1 of air, (e.g. the substrates which form parallel plates) within the imaging beam path is higher as it is desired by the optical design. This reduces the image quality and necessitates more lenses and/or lenses having a more complicated shape within the stack to compensate for the reduced image quality. Thus, the adaptation of "classic" lens designs and the use of the design rules which apply for these classic lens designs which avoid the occurrence of specific imaging errors cannot be used in the design of such wafer scale lenses.

The just mentioned wafer scale optics and sandwiches thereof may be used in digital cameras and, by their nature, always incorporate substrates (wafers). From the manufacturing perspective it is actually advantageous that these substrates are comparatively thick compared to the (UV-polymer replicated) lenses which are formed on top of the substrate or on both sides of the substrate. However, this is contradiction to lens arrangements observed in classical objective designs where for example arrangements of one or several thin but strongly bent meniscuses are applied in order to reduce aberrations and especially to obtain a small astigmatism. This is a drawback of state-of-the-art wafer scale lens designs as due to the evident problem of astigmatism in these designs their optical performance is poor although much more complex (highly aspheric) lens shapes are applied. The problem of thick substrates is especially evident for the above mentioned meniscus lenses, which is the lens that has lens surfaces which are curved into the same direction. As mentioned above, in conventional optical systems a strong curvature of the meniscus is desired, however, applying this design rule to wafer scale optics will necessitate the provision of a glass substrate between the opposing lens areas. In view of the strong curvature of the opposing surfaces of the meniscus a high thickness may be used so that the lens will lose its optical advantages.

An alternative approach for manufacturing lenses on a wafer scale is to emboss the complete lens wafer from a polymer material which allows lenses to be generated which are very thin. However, this approach is disadvantageous, as the wafer itself is not a stable support device (e.g. a stable glass support). This instable support will result in inhomogeneities regarding the thickness and the bending of the wafer. Also shrinkage of the wafer is observed resulting in a lateral uncertainty. These effects can be severe such that a plurality of wafers or plates cannot be stacked on top of each other.

Another approach known in the art for manufacturing lenses is the injection molding of lenses. However, the procedural overhead for generating lenses using injection molding in terms of machinery and in terms of process steps is disadvantageous. Further, no manufacturing on a wafer scale is possible.

SUMMARY

According to an embodiment, a method for manufacturing a lens comprising a lens portion may have the steps of: (a) providing a substrate comprising a hole extending from a first surface of the substrate to a second surface of the substrate; b) providing a sacrificial material in the recess, the sacrificial material comprising a shape in accordance with a first desired lens surface; c) applying a lens material to the substrate and to the sacrificial material so that the lens material comprises a shape in accordance with the first desired lens surface; and (d) providing the final lens portion by removing the sacrificial material.

According to another embodiment, a lens may have: a lens structure of a lens material, the lens structure comprising a support portion and a lens portion comprising a first desired lens surface and a second desired lens surface; and a substrate comprising a recess in a first surface of the substrate, wherein the lens structure is arranged at the substrate such that the lens structure's support portion is attached to the first surface of the substrate and such that the lens structure's lens portion is aligned with the substrate's recess, the lens portion being manufactured in accordance with a method for manufacturing a lens comprising a lens portion, which method may have the steps of: (a) providing a substrate comprising a hole extending from a first surface of the substrate to a second surface of the substrate; (b) providing a sacrificial material in the recess, the sacrificial material comprising a shape in accordance with a first desired lens surface; (c) applying a lens material to the substrate and to the sacrificial material so that the lens material comprises a shape in accordance with the first desired lens surface; and (d) providing the final lens portion by removing the sacrificial material.

According to another embodiment, an optical system including one or more lenses may have: a lens structure of a lens material, the lens structure comprising a support portion and a lens portion comprising a first desired lens surface and a second desired lens surface; and a substrate comprising a recess in a first surface of the substrate, wherein the lens structure is arranged at the substrate such that the lens structure's support portion is attached to the first surface of the substrate and such that the lens structure's lens portion is aligned with the substrate's recess, the lens portion being manufactured in accordance with a method for manufacturing a lens comprising a lens portion, which method may have the steps of: (a) providing a substrate comprising a hole extending from a first surface of the substrate to a second surface of the substrate; (b) providing a sacrificial material in the recess, the sacrificial material comprising a shape in accordance with a first desired lens surface; (c) applying a lens material to the substrate and to the sacrificial material so that the lens material comprises a shape in accordance with the first desired lens surface; and (d) providing the final lens portion by removing the sacrificial material.

To overcome the problems outlined above with regard to the conventional wafer scale technology which necessitates the use of substrates to which the UV-polymer replicated lenses are applied the inventive approach avoids the provision of unnecessary material, e.g. glass, in the optical path.

In accordance with embodiments of the invention, lenses are manufactured by a multi-step sacrificial material process above one or more recesses or through holes in a substrate, e.g. a glass substrate. The conventional approach of directly forming the lenses on the surface(s) of a glass substrate is no longer pursued. The advantage of the inventive approach is that no "thick" glass is in the optical path. Thus, the lens thickness is substantially determined by the optic design which allows the use of much more advantageous lens shapes. Since the glass substrate outside the cavity of the imaging beam path is still maintained, also the overall mechanical stability of the arrangement is ensured.

Thus, when compared to conventional approaches the inventive approach is advantageous from an optical design perspective. Otherwise the substrate thickness introduces astigmatism into a convergent bundle so that in conventional wafer scale lens optical designs this had to be corrected by more elements and/or more complex lens shapes. Alternatively, one had to live with the poor optical performance. The substrate thickness increases TTL (TTL=total track length) since this means more than necessitated "high index material" in the optical path. The high index material, i.e. the material having a high refraction coefficient "n" (n about 1.5), increases the track to n*f (assuming 100% filling of the optical path with small n). Thus, the less the filling in the optical path is the less is the increase of thickness. In order to reduce TTL even with a thick substrate conventionally rays are bend outwards in front of the lens stack and bend back towards the optical axis close to the image sensor to reduce the CRA (CRA=chief ray angle). This results in high refractive power of the lenses, which is actually not needed but results in strong aberrations, which again have to be corrected by complex lens shapes, however, this results in unnecessary tight tolerances.

In classic lens design menisci are typically the elements of choice, and the lens thickness is tried to be determined by the optical needs and not by mechanical/process constraints. The reduction of the number of geometrical constraints such as substrate thickness or residual replication layer thickness generally simplifies lens design since the degrees of freedom are increased. Optics are the better or uncritical with respect to tolerance the less ray bending happens when the light bundles propagate through the lens. Therefore, it is intended that the light beams hit lens surfaces as perpendicular as possible which, in turn, needs strongly bent lens surfaces. In case substrates are necessitated in between these surface that means that the center thickness of the lens will be very high with the above mentioned problems as a consequence.

Applying the inventive approach avoids the need to provide substrates in the optical path. In accordance with the inventive design only the lens structure itself or only the optically useful part of the lens structure is within the optic path thereby avoiding the just mentioned problems.

In accordance with embodiments of the invention a process for manufacturing lenses is taught which may be considered analog to MEMS micromachining. In accordance with this process a substrate or wafer, e.g. a glass substrate or wafer, is used which comprises a recess or a hole or a cavity. The recess is filled with a solvable stamp material or sacrificial material, like a photoresist, into which the negative lens surface structure is shaped. The desired second side lens shape is then formed by applying a non-dissolvable lens material and following this the sacrificial material is dissolved using a solvent which only removes the sacrificial material but not the lens material.

An advantage of the inventive approach is that it is now possible to manufacture wafer scale lenses with a design which does no longer have to take into consideration the glass substrate. One further advantage is that by avoiding the optical unnecessary glass substrate (=parallel plates) within the convergent beam path the aberration type astigmatism is reduced or completely avoided. Thus, it is no longer necessary to correct possible image errors by additional measures and/or lenses having a complicated design. This results in a more simple design and reduces costs for the optical system.

BRIEF DESCRIPTION OF THE DRAWINGS

Embodiments of the present invention will be detailed subsequently referring to the appended drawings, in which:

FIGS. 5(a)-(e) show the steps for manufacturing a biconvex lens in accordance with an embodiment of the invention;

DETAILED DESCRIPTION OF THE INVENTION

FIG. 1 shows an embodiment for manufacturing a plano convex lens.

Figure 1A:
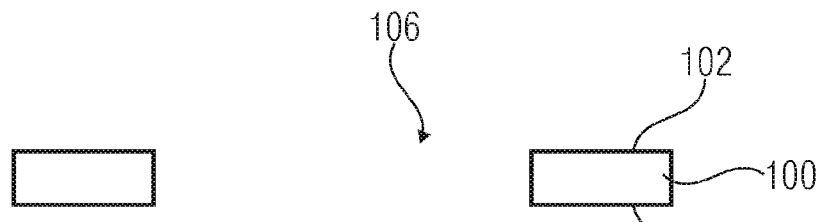
FIGS. 1(a)-(d) show the steps for manufacturing a plano convex lens in accordance with an embodiment of the invention.

As is shown in FIG. 1(a) a substrate 100 is provided, which is shown in a cross-sectional view and comprises two opposing surfaces 102 and 104 and a recess 106 formed in the upper surface 102 of the substrate 100 and extending through the thickness of the substrate 100 to the lower surface 104 of the substrate 100 thereby defining a hole through the substrate 100. The hole in the substrate 100 is temporarily filled with a solvable polymer (a sacrificial material) 108 (see FIG. 1(b)). The polymer may be a solvent (e.g. acetone or isopropanole)-soluble polymer, like a conventional photoresist or a special water-soluble polymer/photoresist (typically on a polyvenylalcohole-basis). A portion 110 of the polymer 108 is shaped in accordance with a first desired lens surface. The portion 110 is only shaped into the polymer material 108 within the recess 108.

Figure 1B:
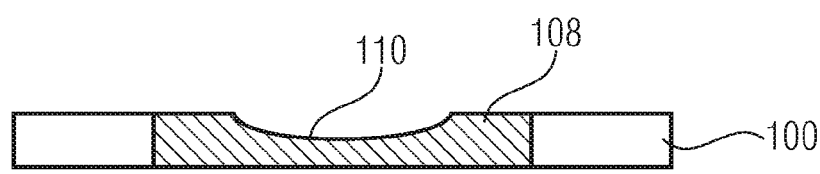
Figure 1C:
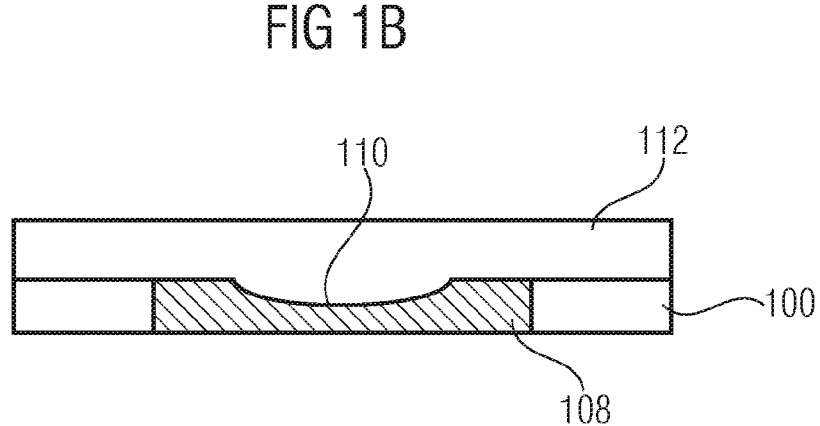

A final UV-polymer 112 (which may be an organic-inorganic hybrid polymer) is applied to the structure shown in FIG. 1(b). The polymer 112 is applied such that the UV-polymer 112 strongly overlaps the recess or hole 106, i.e. extends also onto the upper surface 102 of the substrate 100. The side of the polymer 112 which faces the substrate 100 is shaped by the portion 110 in the sacrificial layer 108 into the first desired lens surface and the opposing side of the polymer may be shaped by providing a stamp having a portion of the negative shape of the second surface of the intended lens structure. The lens to be generated shown here is a plano convex lens, so that the stamp used for shaping the backside of the lens structure is of a flat shape in this case. After applying the stamp to the material 112 a structure is obtained as it is shown in FIG. 1(c). After having cured the polymer 112 the temporary polymer material 108 is removed from the hole 106 which results in the structure (the final lens) shown in FIG. 1(d). The final lens 114 comprises the lens structure 112 and the support 100. The lens structure 112 comprises a lens portion 112a and a support portion 112b. Other than in conventional approaches the lens portion 112a is provided above the recess 106 of the substrate 100 without any glass material or other "high-refractive-index" (higher than that of air or vacuum) transparent material in the light beam path.

FIG. 2 shows a similar process as in FIG. 1 for manufacturing a plano concave lens and the steps shown in FIG. 2(a) to (d) are basically the same as shown in FIG. 1 except that the temporary polymer material 108 is shaped differently to obtain the desired concave lens.

Figure 2A:
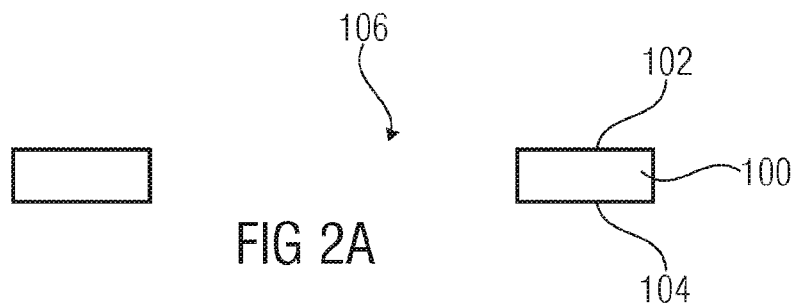
FIGS. 2(a)-(d) show the steps of manufacturing a plano concave lens in accordance with an embodiment of the invention.
Figure 2B:
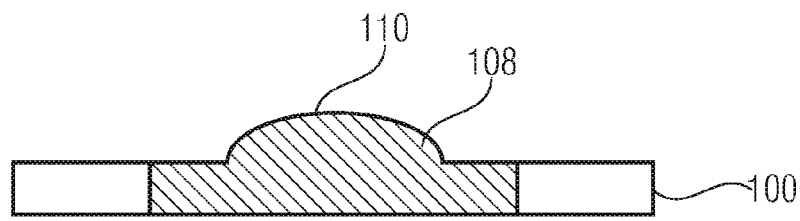
Figure 2C:
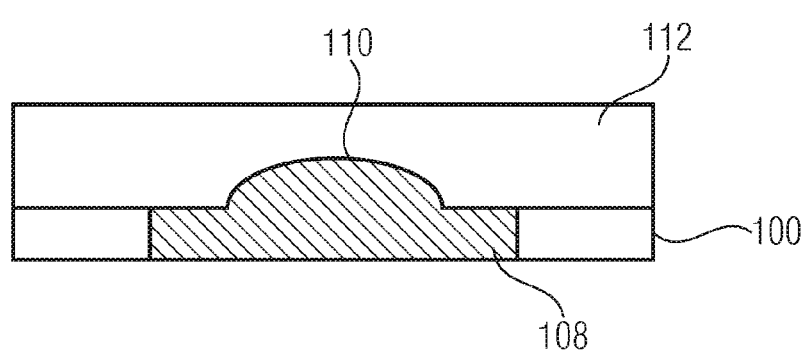

In FIGS. 1(b) and 2(b) the temporary polymer material 108 may be provided such that the substrate and the hole 106 are covered by the polymer material 108 a portion 110 of which is then shaped in accordance with a first desired lens surface. The material 108 may be shaped or structured by lithographic or imprinting processes such that a least a part of the upper surface 102 of the substrate 100 is exposed to ensure that the lens material 112 will contact the substrate at least partly to allow for the support of the lens structure by the substrate 100. The portion 110 may be formed in the polymer material 108 by providing a slightly deformable material and using a stamp for imprinting the first desired surface followed by a curing process. In other embodiments the polymer 108 may be shaped by photolithographic etching processes. Alternatively, the polymer material 108 may be provided in liquid form. The liquid material may be casted into the recess 108 and the portion 110 defining the first desired surface of the lens is imprinted by means of a mold. The material 108 is then thermally cured or cured by other means, e.g. UV illumination.

Alternatively, the polymer 108 may be provided beforehand, i.e. a block of polymer material is provided and shaped in accordance with the first desired lens surface and the dimensions of the recess 106. This prepared block is inserted into the recess 106 yielding the structure shown in FIG. 1(b) and FIG. 2(b).

In the following, with respect to FIG. 3, an alternative design of the plano convex lens of FIG. 1 is described. When compared to the embodiment described with regard to FIG. 1 or FIG. 2 the substrate 100 comprises the recess 106 which does not extend from the upper substrate surface 102 to the lower substrate surface 104. As is shown in FIG. 3(a), the lower end of the recess is closed. FIG. 3(b) shows the lens 114 comprising the substrate 100 and the lens structure 112 which comprises the lens portion 112a and the support portion 112b resting on the substrate 100. The steps for manufacturing the lens 114 shown in FIG. 3(b) are substantially the same as described in FIG. 1 or FIG. 2 except that removing the sacrificial material 108 is done a different way. While in accordance with FIGS. 1 and 2 the sacrificial material 108 may be removed from the lower side of the substrate 100 as the recess extends through the entire substrate, in accordance with the embodiment of FIG. 3 one or more openings 116 are provided in the substrate 100 to connect the recess 106 to the surroundings of the substrate 100. The openings or channels 116 may be provided at any position in the substrate, for example, in the "side walls" of the cavity shown in FIG. 3(b) or in the bottom, i.e. the channels 116 may extend from the side faces from the lower surface 104 of the substrate into the recess 106. Although FIG. 3(b) illustrates only a single channel, a plurality of channels may be provided. The channels 116 may be provided either following the forming of the lens structure 112 or beforehand, i.e. may already be provided in the structure shown in FIG. 3(a).

After filling the recess or cavity 106 with the polymer material 108, forming the sacrificial layer and after applying the lens material and curing same a solvent is applied to the cavity through the one or more openings 116 thereby dissolving the sacrificial material 108 and removing same via the channels 116. Following the removal of the polymer material 108 the one or more channels 116 may be closed again to seal the cavity 106 from the environment. In the embodiment of FIG. 3 the substrate 100 may be pre-processed such that additional circuitry is provided in the lower part thereof, as is indicated in FIG. 3 by reference sign 120. The circuitry may include photo sensitive areas or other sensitive areas which receive incident light beams or other electromagnetic beams which are coupled to the desired area of the circuitry 120 by means of the lens structure 112. The processing of the circuitry 120 may be done through the recess 106. In an alternative embodiment the structure shown in FIG. 3(a) may be obtained by providing two substrates or wafers, an upper wafer including the recess 106 extending through the entire thickness thereof and a lower substrate including the circuitry 120. The two substrates are then wafer bonded to yield the structure shown in FIG. 3(a) as is indicated by the line 122. In another embodiment, an additional spacer layer may be provided between the substrates 100 and 104.

Figure 1D:
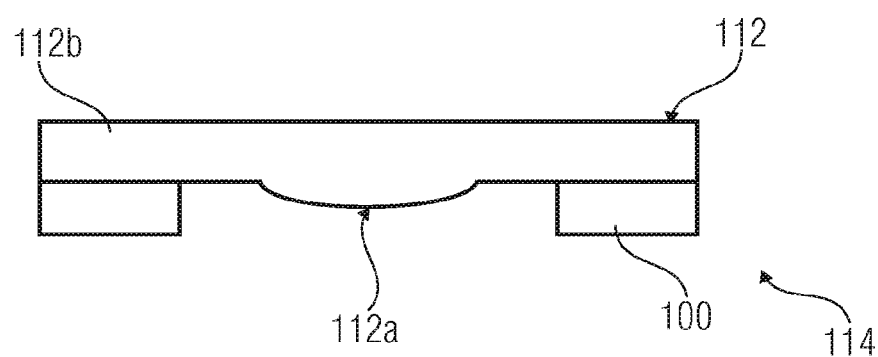
Figure 2D:
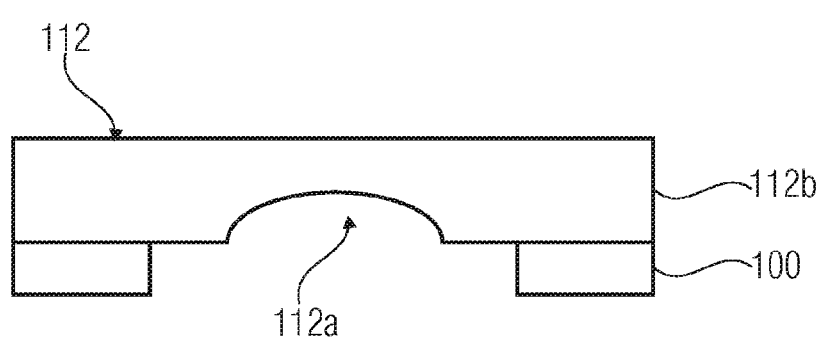
Figure 3A:
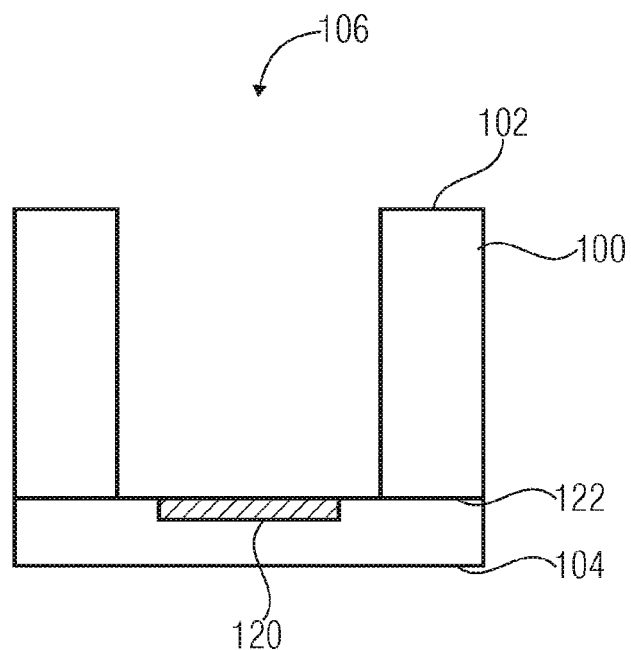
FIGS. 3(a)-(b) illustrate an alternative design of the plano convex lens of FIG. 1.
Figure 3B:
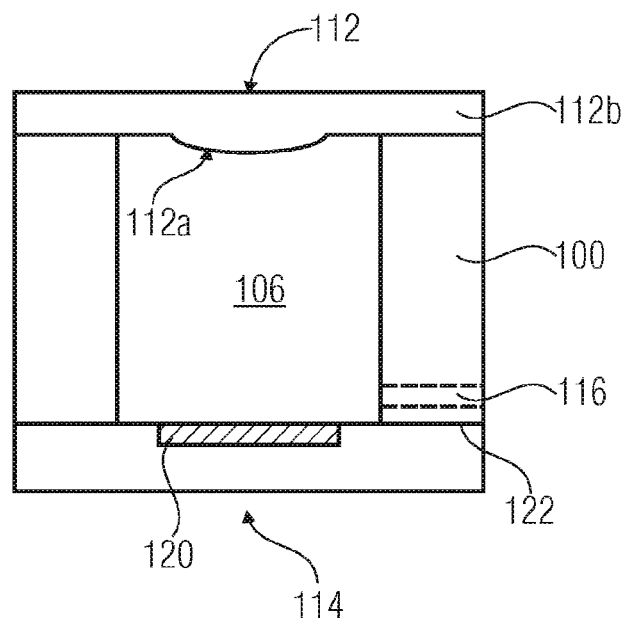

As far as the wafer bonding of a lower substrate to a spacer substrate is concerned, it is noted that this lower substrate comprising the circuitry 120 may also be bonded to the structure shown in FIG. 1(d) or FIG. 2(d) yielding a desired optical system.

In addition, it is noted that the above mentioned processes for manufacturing lens structures may also be done in wafer scale, i.e. on the basis of a wafer comprising a plurality of recesses allowing the formation of a plurality of lenses at the same time. Following the definition of the lens structure the wafer may be bonded to a further wafer including the respective circuitry as shown in FIG. 3 and is then diced to obtain single elements. Alternatively, it is also possible to dice the lens wafer first and to apply the respective diced elements onto the substrate or element including the desired circuitry.

Figure 4A:
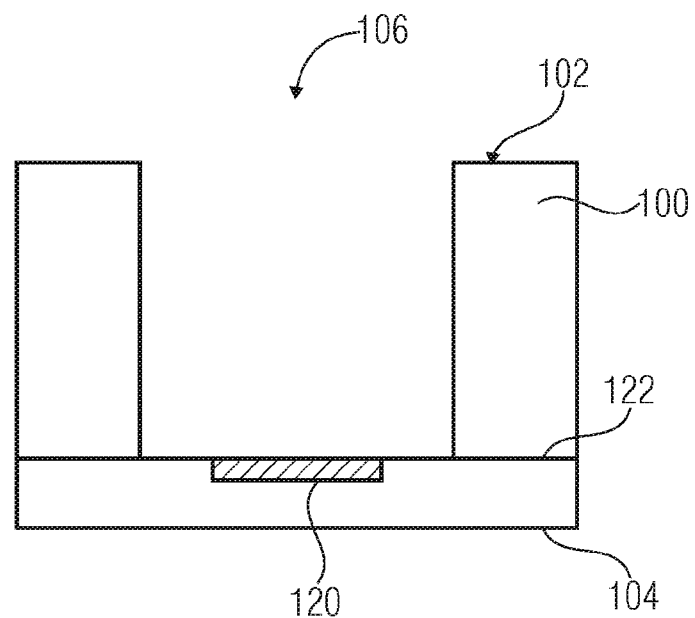
FIGS. 4(a)-(d) show the steps for manufacturing a meniscus lens using a substrate shown in FIG. 3(a) and a mold in accordance with an embodiment of the invention.
Figure 4B:
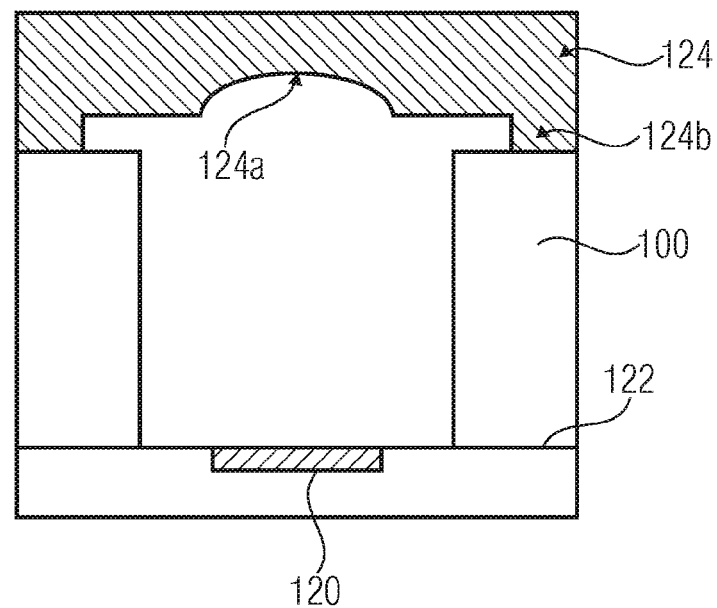
Figure 4C:
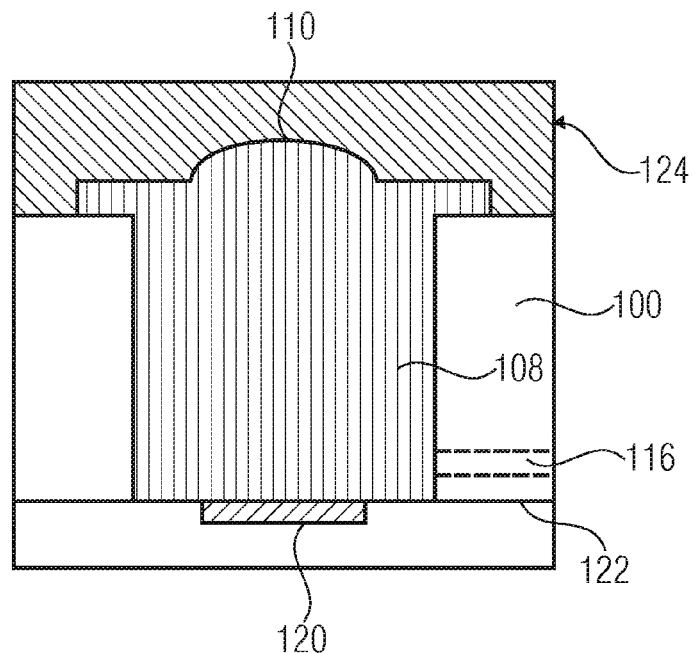
Figure 4D:
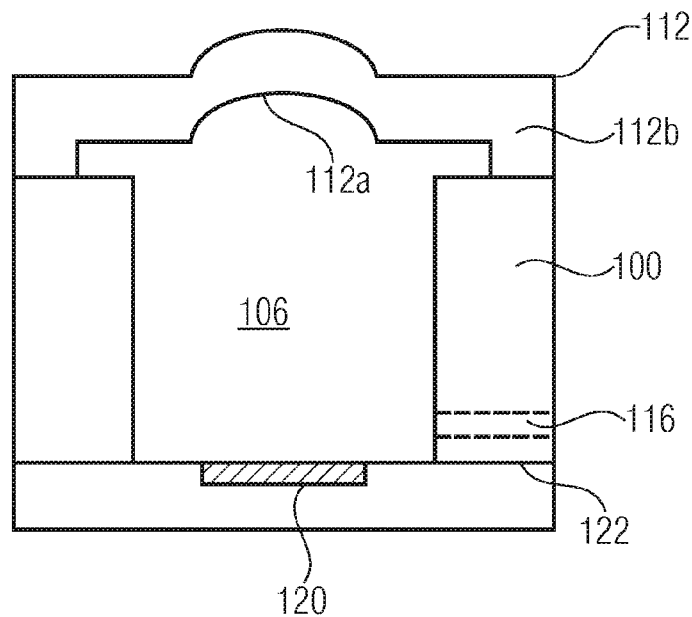

A further embodiment of the invention will now be described with reference to FIG. 4. The manufacturing of a meniscus lens unit using a substrate as it is shown in FIG. 3(a) will be described. FIG. 4(a) shows the substrate 100. The line 122 indicates that the substrate 100 may be formed of two wafer bonded substrates, one including the recess 106 and the other including the circuitry 120. A mold 124 defines a desired shape of the polymer material or the sacrificial material 108 onto which the lens material will be applied. The mold 124 for shaping the polymer material 108 comprises a lens portion 124a as well as a support portion 124b. The mold 124 is provided either after filling the sacrificial material 108 into the recess 106 or before filling the material into the recess 106, the latter situation being shown in FIG. 4(*b*). In a subsequent step illustrated in FIG. 4(*c*) the polymer material 108 is introduced into the recess 106 via the opening or channel 116. Alternatively, the polymer material 108 is introduced into the open recess 106 shown in FIG. 4(*a*) and then the mold 124 is applied. In both processes the polymer material 108 is shaped by the mold so that in a region above the recess 106 the portion 110 defining the first desired lens surface 110 is formed. After curing the polymer 108 the mold 124 is removed and the lens material 112 is applied to the now structured polymer material 108. The surface of the lens material 112 facing away from the polymer 108 is shaped (e.g. by a stamp) in accordance with a second desired lens surface, a convex surface in FIG. 4 thereby defining the desired meniscus lens. The polymer 108 is then removed through the one or more openings 116 to yield the optical system or lens structure as shown in FIG. 4(*d*). The mold 124 defines the support portion 124*b* to ensure that the final lens structure 112 and more specifically its respective support portion 112*b* may rest on the upper surface 102 of the substrate 100.

FIG. 5 illustrates the steps for manufacturing a bi-convex lens in accordance with another embodiment of the invention. In a similar manner as described with regard to FIGS. 1 and 2 the substrate 100 is provided as shown in FIG. 5(*a*). The recess 106 is provided with a polymer material 108 forming the sacrificial material being shaped in accordance with the desired first lens surface to be generated (see in FIG. 5(*b*)). Onto this structure the lens material 112 is applied. A lens mold or stamp 126 defines a desired lens structure or second lens surface shape 126*a*. As is indicated by the arrow shown in FIG. 5(*c*) the mold or stamp 126 is pressed into the material 112. Following curing of the material 112 the stamp 126 is removed, as is indicated by the arrow shown in FIG. 5(*d*), yielding the bi-convex lens structure 112 which, following removal of the sacrificial material 108, is arranged above the recess 106 in the substrate 100 as shown in FIG. 5(*e*).

Further embodiments of the invention will be described with regard to the manufacturing of lens structures on a wafer basis. In accordance with these embodiments, a spacer wafer provided with holes is used, wherein the holes are temporarily filled with a solvable polymer material, for example a material as mentioned above with reference to FIG. 1. In the polymer the first lens surface shape, for example the backside of a meniscus lens, is shaped only in a position at the hole. Then a final UV-polymer, for example an organic-inorganic hybrid polymer (such as e.g. Ormocomp by Microresist Technology GmbH), is applied and the desired shape of the front side of the lens is formed by means of a stamp which now has a negative shape of the intended front side. The polymer lens material is applied such that it strongly overlaps the hole to allow connection to the wafer. Following curing of the polymer material defining the lens structure the temporary polymer is removed, also from the inside of the holes which results in free standing thin but strongly bent lenses attached to the substrate. These steps may be repeated for other lenses. Dependent from a desired structure of an optical system, wafer thicknesses and orientations are selected to obtain a desired optical property of the overall system.

FIG. 6 describes an embodiment for manufacturing an array of meniscus lenses. A spacer wafer 100 is provided which has a plurality of holes or openings 106 which extend from an upper surface 102 of the wafer 100 to a lower surface 104 of the wafer (see FIG. 6(*a*)). The hole-wafer 100 is fabricated with a desired thickness and the openings 106 are provided, for example by etching or precision powder blasting through the thickness of the substrate 100 or by casting the wafer 100 in a specially shaped mold or by replication using a special stamp. Further, a lens stamp wafer 130 is provided. The lens stamp wafer comprises a support layer 132 and a patterned layer 134 arranged on the substrate 132. The patterned layer 134 is patterned to define the negative shape of the intended first side of the meniscus lenses to be generated, as is shown by the shaped portions 136 of the lens stamp wafer. As is shown in FIG. 6(*a*) the number of shaped portions 136 in the patterned layer 134 of the lens stamp wafer 130 corresponds to the number of openings 106 in the support wafer 100. The support wafer 100 and the lens stamp wafer 130 are fabricated to have a shape as shown in FIG. 6(*a*).

The support wafer 100 and the lens stamp wafer 130 are aligned with each other such that the openings 106 are aligned with the shaped portions 136 of the lens stamp wafer. More specifically, the wafer 100 and the stamp 130 are manufactured such that when aligning the two elements the centers of the openings 106 are aligned with the respective openings of the shaped portions defining a recess in an upper surface 138 of the patterned layer 134 of the lens stamp wafer 130. Further, in the embodiment shown in FIG. 6(*a*) the holes or openings 106 in the wafer 100 have a lateral dimension which is greater than the corresponding lateral dimension of the shaped portions or recesses 136 so that a first part of the respective opening 106 overlaps the opening or recess 136 wherein a peripheral part of the opening 106 overlaps a part of the upper surface 138 of the stamp wafer 130.

The wafers 100 and 130 are brought into contact in a manner as shown in FIG. 6(*b*). The wafer 100 and the wafer 130 are temporarily attached to each other, for example by clamping the aligned spacer wafer and stamp assembly.

A dissolvable mold material, for example a photoresist, is applied to the structure shown in FIG. 6(*b*) such that the dissolvable mold material 108 fills both the respective openings 106 in the wafer 100 and also the shaped portions 136 in the lens stamp wafer 130. The dissolvable mold material (the sacrificial material) may be applied such that the upper surface 102 of the spacer wafer 100 is covered. The mold material 108 may be applied to the structure shown in FIG. 6(*b*), for example by spin coating or spray coating. For the following replication steps the polymer material or dissolvable mold material 108 is cured. By the curing the polymer material bonds or adheres very strongly/rigidly to the corresponding surfaces of wafer 100. While FIG. 6(*b*) shows that the dissolvable mold material (the sacrificial material) is also applied to the upper surface 102 of the spacer wafer 100, it is noted that the invention is not limited to such an embodiment. Rather, the polymer material 108 may be applied such that the openings 106 in the wafer 100 are only partly filled. In this case, again by curing the polymer material bonds or adheres very strongly/rigidly to the side surfaces of opening 106 in the wafer 100.

It is noted that the subsequent replication steps in general do not necessitate high pressure. Actually, the UV replication is effected substantially without any pressure or with almost no pressure. The pressure that may be exerted may the one to distribute the lens material of low viscosity across the wafer without any air bubbles trapped. The viscosity of the lens material is such that for shaping the lens material almost no force is required. The lens material (polymer) will be cross linked by UV illumination and thus become stable.

In a following step, which is shown in FIG. 6(*d*), the molded spacer wafer 100 and the lens stamp wafer 130 are separated from each other, for example by lifting the molded spacer layer 100 from the stamp layer 130.

Now, a top stamp wafer 140 is provided which comprises a support layer 142 and a patterned layer 144 having a plurality of shaped portions 146. The shaped portions 146 are formed by recesses in a surface 148 of the top stamp wafer 140. The recesses 146 are shaped to define a negative shape of the intended second side of the meniscus lenses. As is shown in FIG. 6(e) the molded spacer wafer 100 is flipped, and a lens material, for example a UV-curable polymer material, is applied to the surface 104 of the spacer wafer 100 and to the sacrificial material 108. The spacer wafer 100 with the applied lens material 112 is aligned with a top stamp wafer 140. The alignment is such that the center of the recesses 146 in the top stamp wafer 140 are aligned with the center of the sacrificial structure 108 formed in the spacer layer 100. Following the alignment of the respective wafers 100 and 140 the top stamp wafer 140 is pressed onto the wafer 100 having applied thereto the lens material 102 to imprint the top lens profile on the dissolvable spacer mold profile 108 as is shown in FIG. 6(f). As can be seen, by means of the top stamp wafer 140 the lens material 112 is formed with the desired second lens surface shape. To be more specific, the lens shape 112 now already has the desired lens portions 112a and the necessitated support portions 112b overlapping with the surface 104 of the support wafer 100.

Figure 6A:
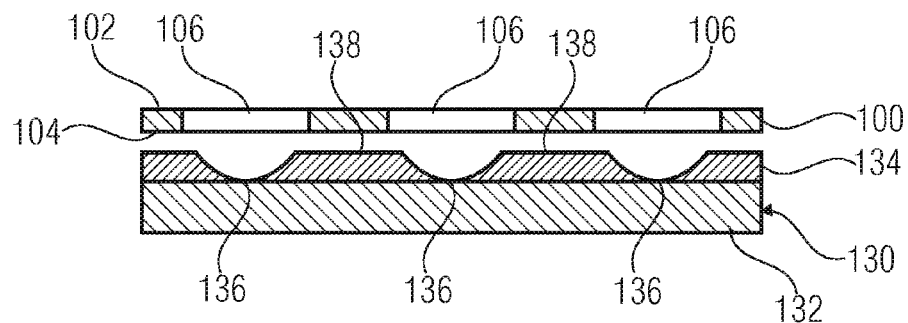
FIGS. 6(a)-(i) show the steps for manufacturing in wafer scale a plurality of meniscus lenses in accordance with an embodiment of the invention.
Figure 6B:
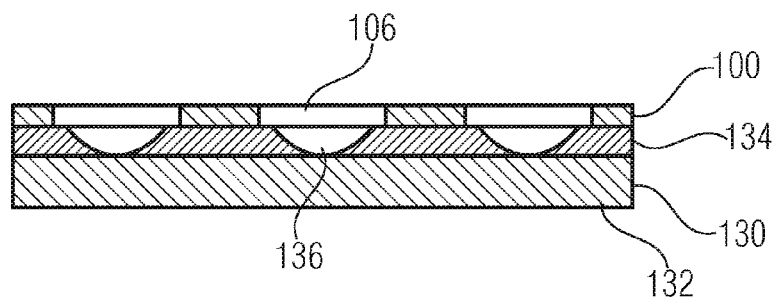
Figure 6C:
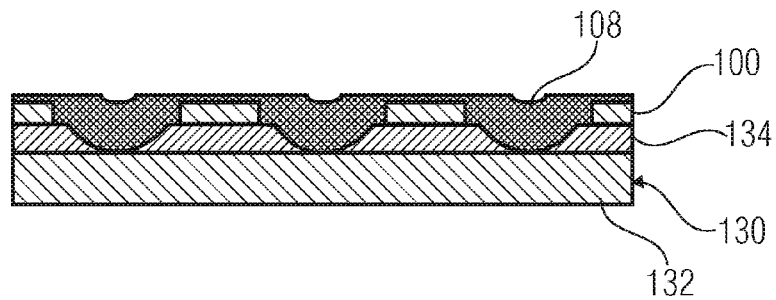
Figure 6D:
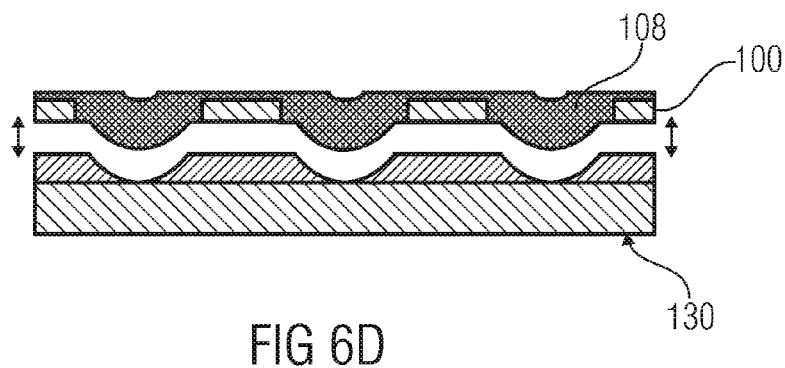
Figure 6E:
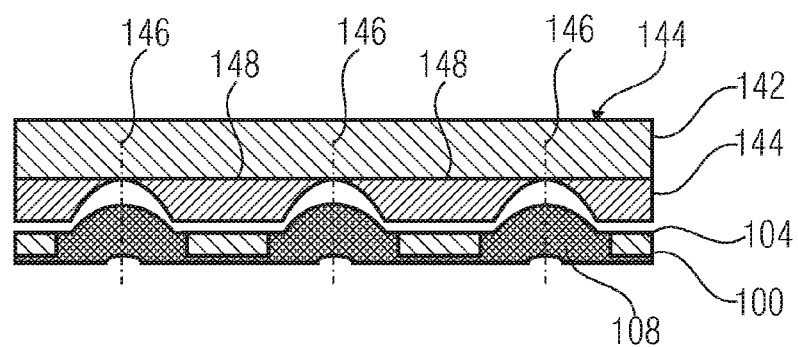
Figure 6F:
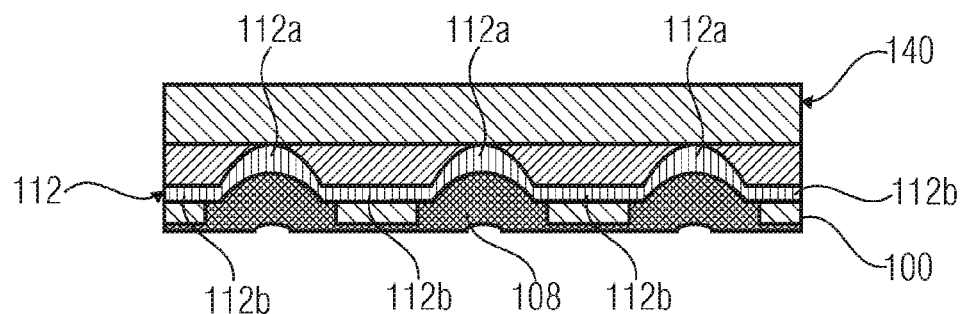
Figure 6G:
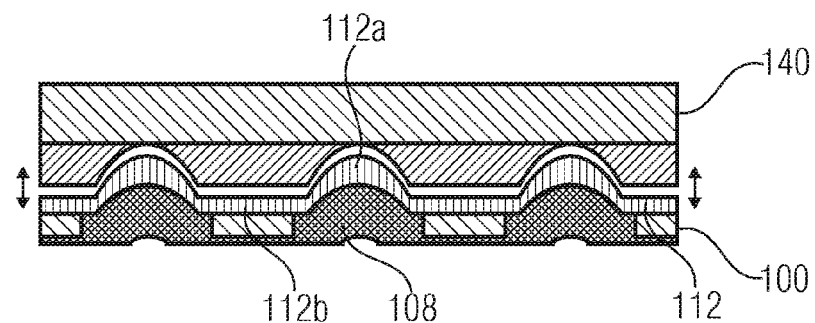

In a subsequent step shown in FIG. 6(g) the lens material 112 is cured and then the spacer wafer 100 having attached thereto the lens structure is separated from the top stamp wafer 140 as is indicated by the arrows in FIG. 6(g).

Figure 6H:
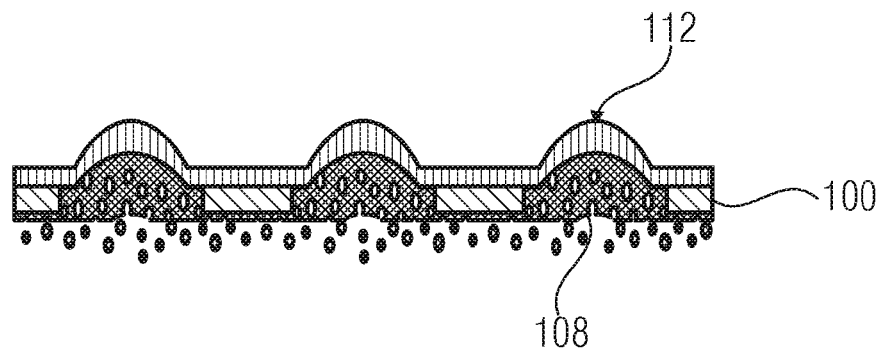
Figure 6I:
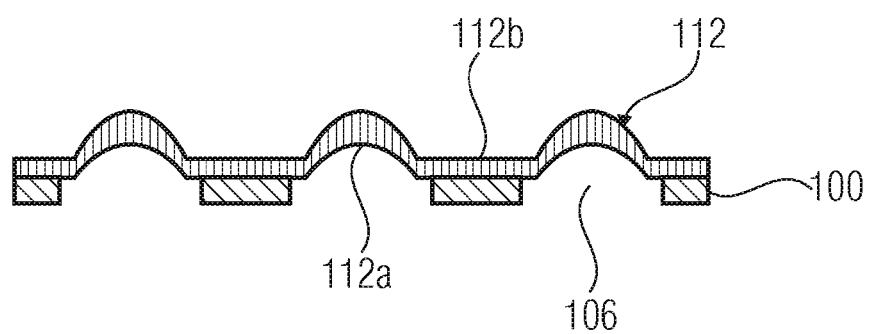

The resulting wafer 100 having attached thereto the desired lens structure 112 is then subjected to a solvent or water bath thereby dissolving the lower lens profile sacrificial mold material 108 as is shown in FIG. 6(h) which, finally, results in the completed meniscus lens wafer with integrated spacer as shown in FIG. 6(i). The lens structure array comprises a plurality of meniscus lenses formed in a wafer scale such that the lens portion 112a of the lens structure is arranged above the opening or hole in the support wafer 100 without any additional glass material thereby avoiding the problems in conventional-technology approaches described above.

FIG. 7 illustrates an alternative approach for manufacturing the meniscus lens array of FIG. 6 starting after the process step shown in FIG. 6(d). The approach described with regard to FIG. 7 provides a plurality of discrete meniscus lenses with integrated spacer. In accordance with the process described in FIG. 7 the molded spacer wafer 100 is provided in manner as described in FIGS. 6(a) to 6(d). Again, a top stamp wafer 140 is provided, however, the top stamp wafer 140 of FIG. 7(a) is modified by providing masked regions 150 within the stamp wafer 140 which will block UV (ultraviolet) light when curing the lens material. The masked regions are provided between the recesses 146 formed in the patterned layer 144 of the stamp 140 such that they partly overlap the regions of the wafer 100 which are arranged between the sacrificial material 108. The masked regions 150 are structured at an interface between the support layer 142 and the patterned layer 144 such that a portion "a" of the intermediate regions of the wafer 100 is masked whereas other portions "b" of this intermediate region are not masked.

The lens material is applied and the stamp 140 is used to imprint the desired lens structure into the lens material. In the curing step the structure is illuminated by ultraviolet light as is shown in FIG. 7(b) which will cure the lens material 112, however, under the masked regions 140 the lens polymer material will remain uncured. The stamp 140 and the wafer 100 are then separated from each other as is shown in FIG. 7(c) and the resulting wafer 100 is subjected to a solvent or water bath thereby dissolving the lower lens profile mold material 108. Also the unexposed polymer material 112c of the lens material 112 is dissolved (see FIG. 7(d)), either during the same process and solvent or during a separate process and solvent. The resulting structure is shown in FIG. 7(e) and the lens structure corresponds to the one shown in FIG. 6(i), however, the respective lenses are discrete lenses as the lens structures 112 are already separated from each other due to the removal of the polymer material 112c discussed above, thereby yielding a spacing a between the respective lens structures. This is advantageous as there is no need to dice through the lens material during separation. Further the substrates may be glued/bonded directly together when stacking thereby avoiding additional (unstable) polymer interfaces.

In the above described embodiments shown in FIGS. 6 and 7 the lens material was applied to the wafer 100 and subsequently the stamp 140 was used to imprint the desired lens top shape into the applied lens material. The thickness of the lens structure is defined by the amount of lens material 112 applied to the wafer 100 and is controlled by precisely determining the gap or distance of the representative interfaces between 100 and 140 in the replication machine e.g. "modified mask aligner" or "IQ-aligner"

Figure 7A:
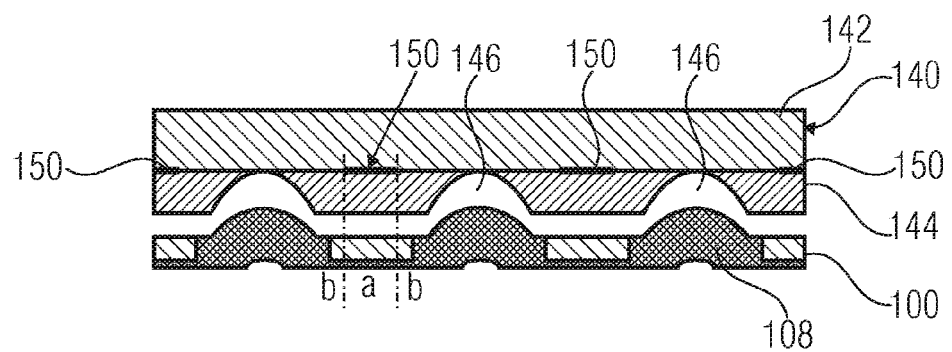
FIGS. 7(a)-(f) illustrate an alternative for manufacturing the meniscus lens array of FIG. 6 starting after the process step shown in FIG. 6(d)
Figure 7B:
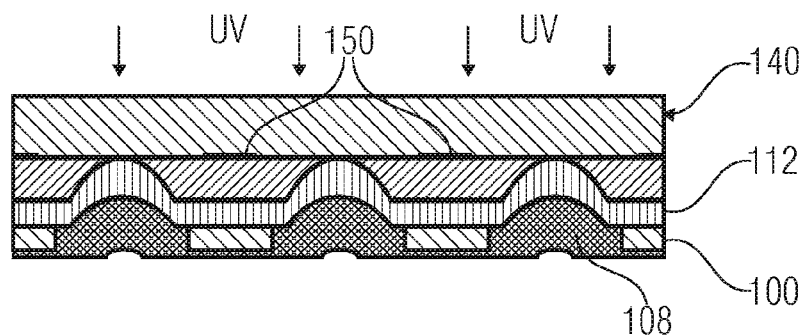
Figure 7C:
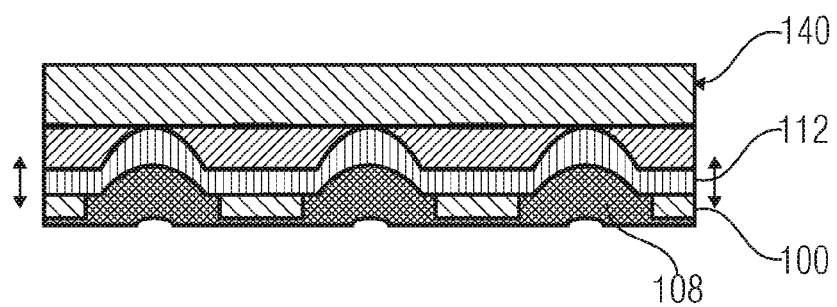
Figure 7D:
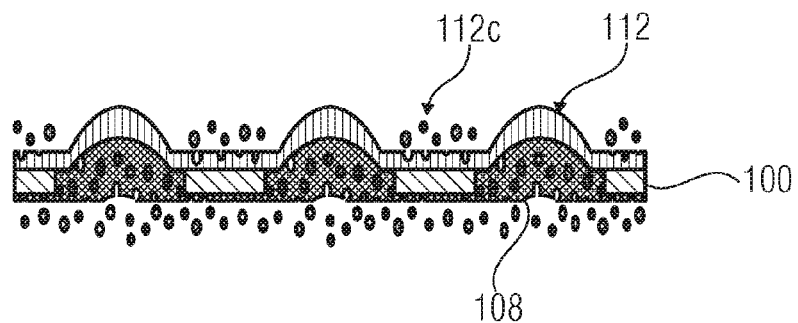
Figure 7E:
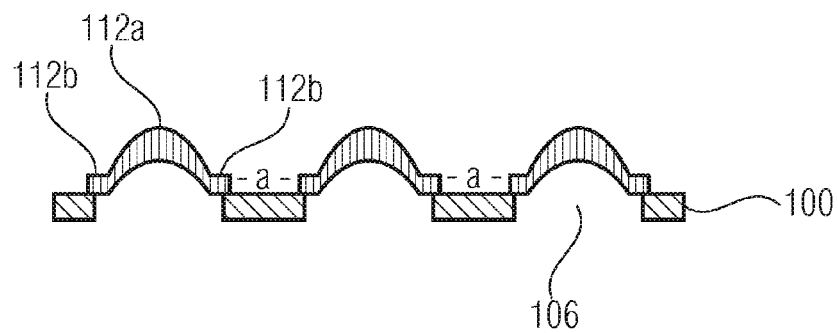
Figure 7F:
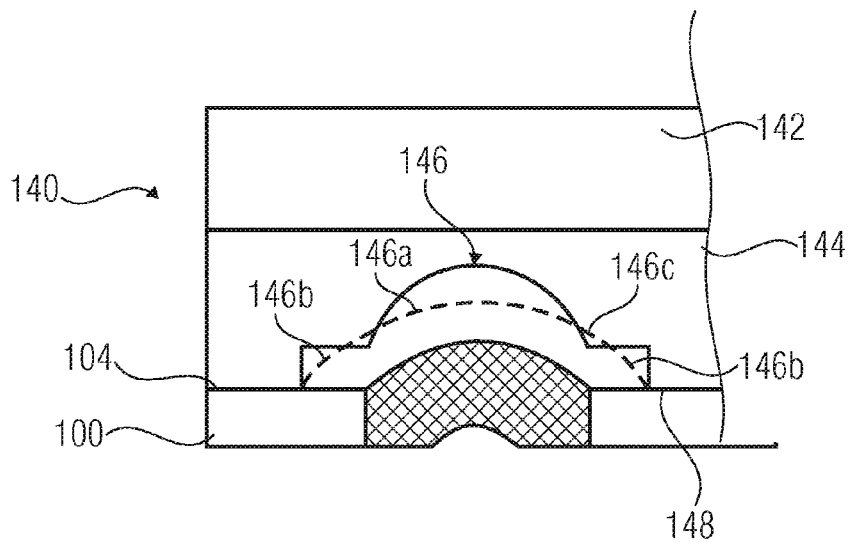

In an alternative embodiment the stamp 140 and the wafer 100 may be aligned with each other as is shown in FIG. 6(e) and FIG. 7(a) without the lens material applied so far. The two wafers are aligned with each other with a distance there between, for example, by providing the respective wafers in appropriate holding devices allowing the arrangement of the two wafers with a predefined distance from each other. Dependent from the desired thickness of the lens structure this distance is set and, subsequently, the lens material is introduced into the space between the wafer 100 and the stamp 140, and the process then further proceeds as is described with regard to FIG. 6(f) to (i) or FIG. 7(b) to (e).

FIG. 7 describes an embodiment yielding discrete lenses in a manner as shown in FIG. 7(e) by dissolving the respective portions 112c of the lens material between the respective lens portions and lens support portions 112a and 112b. However, instead of providing the lens material to the entire surface of the wafer 100 an alternative process may discretely apply the lens material only to the portions where the lens is actually to be formed, for example by dispensing drops of lens material at the positions where the lenses shall later be, namely on top of the structures 108 shown in FIG. 7(a). The lens material may be applied or dispensed by ink-jet printing or other suitable approaches.

A further alternative for providing the discrete lens structures shown in FIG. 7 is to modify the stamp wafer 140. A possible modification is shown in FIG. 7(f) showing an enlarged view of a part of the stamp layer 140 having the modified recess structure 146. As can be seen from FIG. 7(f) the layer 144 is patterned such that the recess 146 has a first portion 146a defining the desired lens profile or upper lens profile. The recess 146 comprises a support portion 146b defining the later support portions 112b of the lens structure. Further, the patterned layer 144 is structured such that the stamp 140 and the wafer 100 are brought into contact with each other, i.e. the surface 104 of the wafer 100 and the surface 148 of the stamp 140 are brought into contact with each other. Alternatively, the recess 148 may be structured such that the entire upper lens surface is larger than the lower lens surface thereby also yielding the central lens portion 146a and the peripheral lens support portions 146b such a shape is indicated by the dashed line 146c in FIG. 7(f).

Figure 8A:
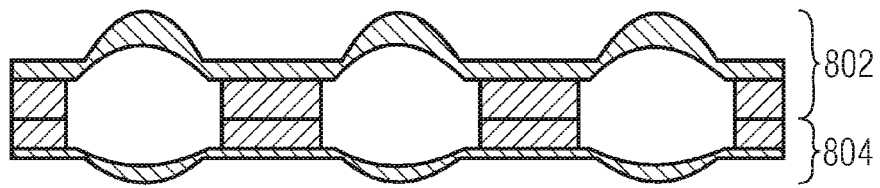
FIGS. 8(a)-(f) show various configurations of wafer scale lenses for use in optical systems which may be manufactured according to the embodiment shown in FIG. 6 and the embodiment shown in FIG. 7.
Figure 8B:
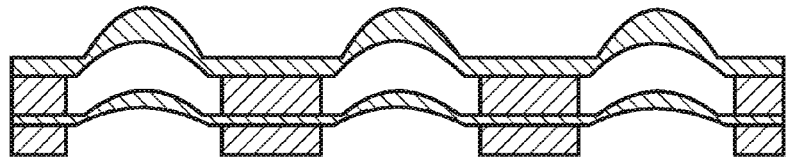
Figure 8C:
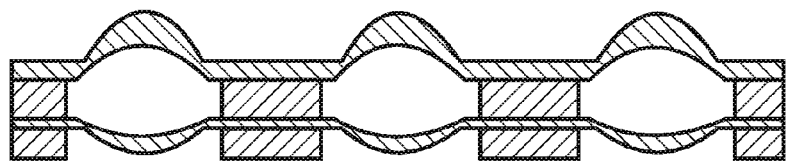
Figure 8D:
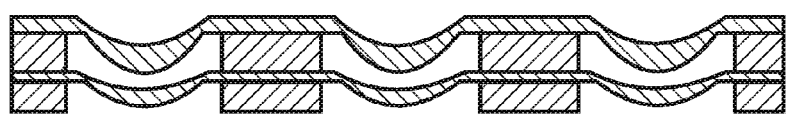
Figure 8E:
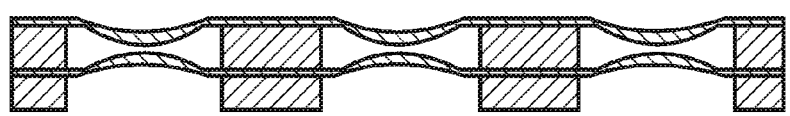

So far single lenses or single lens arrays were described, however, in accordance with embodiments of the invention the respective lenses or lens arrays can be combined with each other or with different lens structures manufactured in the same manner as described above. FIG. 8 shows various configurations of optical systems using lenses manufactured in accordance with the embodiments of FIG. 6 or 7. FIG. 8(a) shows a double stacked convex meniscus stack with an inverted bottom lens, wherein the upper layer 802 and the lower layer 804 were manufactured in accordance with the above described embodiments. FIG. 8(b) shows a double stacked convex meniscus stack wherein the two layers are again manufactured in accordance with the invention, however, using different molds and differently shaped sacrificial materials. FIG. 8(c) shows a stacked convex/concave meniscus stack. FIG. 8(d) shows a double stacked concave meniscus stack, and FIG. 8(e) shows a stacked concave/convex meniscus stack. Clearly, in accordance with the invention further layers of lenses may be added to provide triple stacks or stacks with four or more lens layers. The number and configuration of the respective lenses in the layers depends on a desired optical characteristic of an optical system which is to use the stacked lens structure.

Figure 8F:

FIG. 8(f) shows an embodiment in which, other than in FIGS. 8(a)-(e) the respective lenses are bonded together rather than the spacer layers, i.e. the lens polymer surfaces are bonded together. Again, the two layers of lenses are manufactured in accordance with the invention described above.

Further, in the above described embodiments of the invention lenses are manufactured from a single lens material. The invention is not limited to such lens structures. For example, it is possible to generate lens structures having two or more layers of the same or different lens material, dependent from a desired lens characteristic. For example, following the method step shown in FIG. 6(g), either before or after dissolving the sacrificial material 108 an additional lens material may be applied to the wafer 100 and a further stamp may be used for imprinting the upper surface of the second lens layer profile. A further alternative is to provide a plurality of lens layers spaced apart from each other. In such an embodiment, on the structure shown in FIG. 6(g), for example, a dissolvable material is applied which is structured by an appropriate stamp and following curing of this additional sacrificial material a further lens material is applied, shaped by an appropriate stamp and cured and finally, the sacrificial material between the two lens layers is removed, for example through a respective opening provided in the structure. Although it was described above that the additional layer(s) is/are applied to the upper surface of the existing layer, it is noted that the additional layer(s) may as well be applied to the lower surface of the existing layer.

Figure 9:
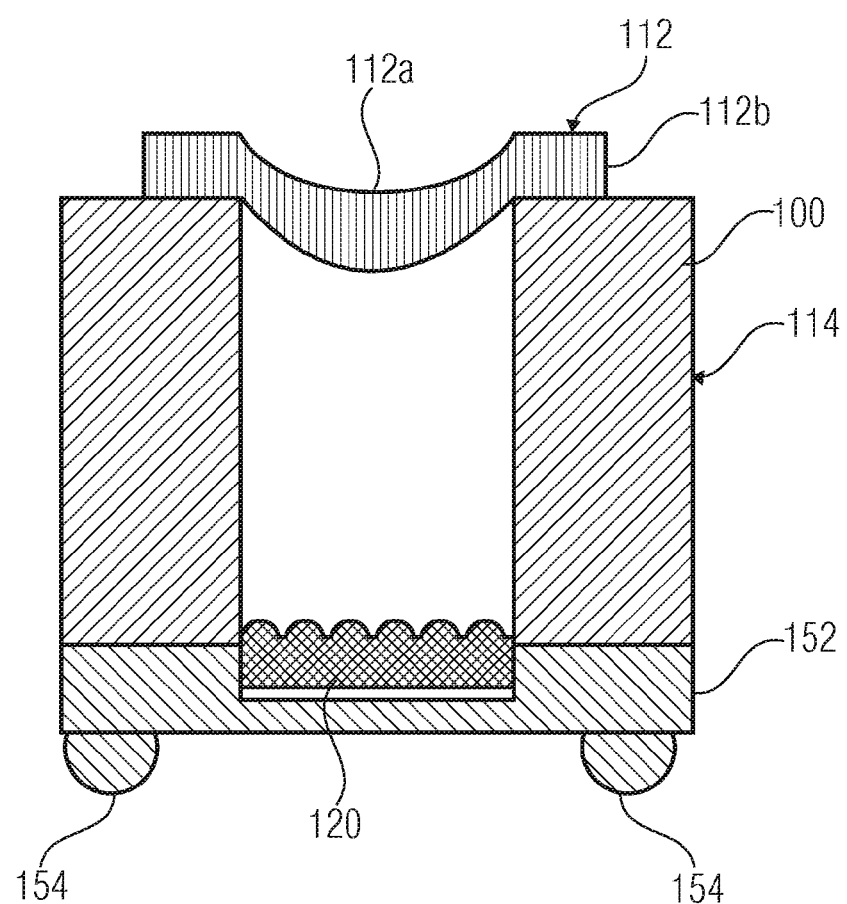
FIG. 9 shows an optical system comprising a lens in accordance with an embodiment of the invention mounted to a chip comprising a photosensitive area.

The respective lenses formed in accordance with the above described embodiments may be applied to integrated circuit substrates or wafers including circuitry having at least a light sensitive region for receiving an incident light beam through the lens. Alternatively, also light emitting elements might be provided for outputting light through the lens. As described above, the additional circuitry might also be provided on a wafer scale. In such an embodiment the lens arrays manufactured in accordance with FIGS. 6 and 7 may be stacked in accordance with the embodiments shown in FIG. 8 and provided to a pre-processed additional circuit layer including the useful circuits described above. After that, the wafers are diced resulting in respective singular devices, an example of which is shown in FIG. 9. FIG. 9 shows an optical system comprising the lens 114 attached to a substrate or chip 152 including circuitry 120 comprising light emitting/light receiving portions. The chip 152 is provided with solder bumps 154 for allowing surface marking thereof to a circuit board for connecting the circuit 120 to respective traces of the circuit board. The lens 114 comprises the lens structure 112 having the lens portion 112a and the support portion 112b mounted to the substrate 100.

For the above described embodiments for manufacturing the inventive lens structures, advantageously the following materials are used (the following materials are only examples and the invention is not limited to such materials):
  as a lens material 112 generally any UV-curable or even any thermally curable polymer may be used, more specifically a organic-inorganic hybrid polymer, like Ormocomp and Ormocore by Microresist Technology, Exfine CO 150 . . . 160 by ChemOptics (acrylic basis); SU8; UV-glues like Zipcone UA by Gelest, Norland N61, N63, N68, Panacol/Elosol Vitralit-family (V1507, V9010), Dymax OPA-20632, Desotech 3471-2-136, Epo-Tek OG134
  as a sacrificial material 108 a water-soluble material like Dymax Gel, conventional photoresists (e.g. from Hoechst, acetone- or isopropanol-soluble); polyvenylalcohol (e.g. from TDI, water-soluble; or polystorol may be used
  as a support substrate 100 glass, ceramic, glass ceramic, metal, metal meshes, casted polymer materials, glues (SU8, Epotek), silicon, germanium, plastic, epoxy molding compounds, as e.g. used for (film assisted) resin transfer molding for packaging integrated circuits (e.g. grey-black with filling), form parts of a thermosetting material, elastomers or other transparent materials including pigments may be used, The glass may be a black structured glass (e.g. Foturan) or D263T from Schott, Borofloat;

The polymer may be PMMA, Polycarbonate, Zeonex (COP); or Topas (COC).
  as stamp support layer 142 a glass (mask blank), silica/quartz, borofloat, D263T may be used;
  as patterned stamp layer 146 PDMS (polydimethylsiloxane), Fluorolink by Solvaysolexis may be used.

In the above described embodiments, the support substrate or wafer 100 was provided with the openings 106. The support wafer is advantageously non-transparent to the radiation to be received by the lens structure. The wafer might either be from an original non-transparent material or it might be a glass wafer which can be illuminated at desired portions to become non-transparent (e.g. Foturan).

In accordance with another embodiment of the invention, the substrate/wafer 100 is formed of a photosensitive glass (e.g. Foturan) which can be structured for a variety of purposes. This material combines the unique glass properties (transparency, hardness, chemical and thermal resistance, etc.) and the opportunity to achieve very fine structures with tight tolerances and high aspect ratio (hole depth/hole width). The glass is masked to determine a desired structure and is exposed to UV light, e.g. light between 290 nm and 330 nm. Atoms, e.g. silver atoms, in the glass are formed in the illuminated areas, and by a following heat treatment, e.g. between 500° C. and 600° C., the glass crystallizes around these atoms. The crystallized areas can be etched, e.g. with a 10% solution of hydrofluoric acid at room temperature, with an etching rate being up to 20 times higher than that of the non-treated areas. Using such a material for the substrate/wafer 100 is advantageous as the structuring of the glass support for the lens structure can be easily achieved.

Figure 10A:
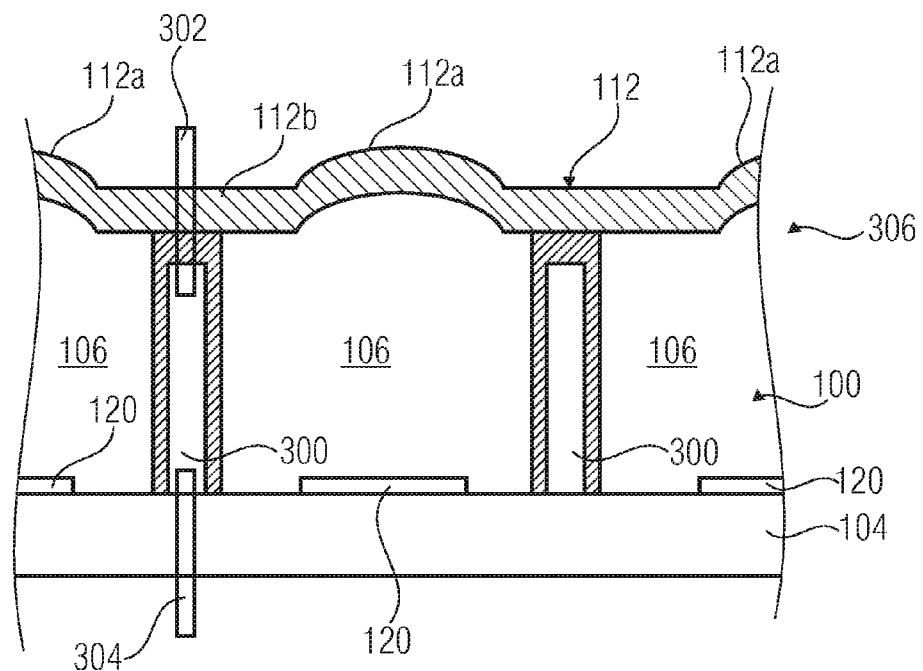
FIGS. 10(a)-(b) show an embodiment using a wafer of a photosensitive glass material for manufacturing lenses on a wafer scale.
Figure 10B:
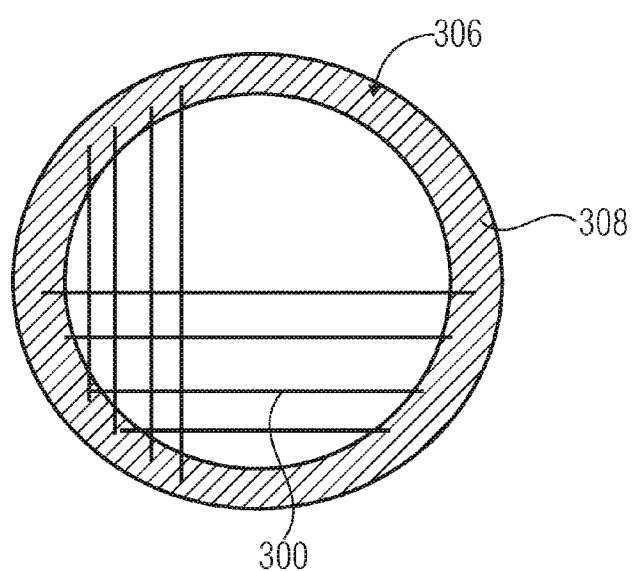

FIG. 10(a) and FIG. 10(b) show an embodiment using the above described material for manufacturing lenses on a wafer scale. FIG. 10(a) shows a cross-sectional view of a portion of the wafer 100 of FIG. 6(i). By masking, illuminating, heating and etching the wafer 100 was structured to define the recesses 106 and further the cavities (slits) 300 that extend into the wafer 100 from its lower surface (the surface opposite to the lens 112). To be more specific, in a first step, the wafer 100 is masked, illuminated, heated and etched to define the cavities 300, and in a second step, the wafer 100 is masked, illuminated, heated and etched to define the recesses 106 (or vice versa). In a third step, the entire remaining wafer 100 is illuminated with UV light thereby making the wafer non-transparent (black). This illumination is advantageously done with a dose that is lower than that used during illumination in the first and second steps. The dose is selected to make the glass non-transparent and to maintain the stability of the glass against the environment (to avoid unintended removal of material due to environmental influences).

The cavities or slits 300 are advantageous as same define "dicing streets" in the wafer 100. In FIG. 10(a) dicing blades 302 and 304 are schematically shown which are used to dice the wafer 100 to which the lens wafer 112 and the circuit wafer 104 are bonded. Only small amounts of the wafer material need to be removed for dicing the wafer structure 306 of FIG. 10(a), namely only the silicon of the circuit wafer 104 and the lens material of lens wafer 112 and a small amount of glass material of the wafer 100.

FIG. 10(b) shows a top view of the wafer structure 306 of FIG. 10(a). To maintain the stability of the wafer structure 306 not all regions of the wafer 100 are provided with the slits 300. Rather, a solid glass supporting ring 308 without dicing cavities 200 is provided.

In the embodiments described above, the side walls of the holes were perpendicular to the substrate surface. However, also other shaped side walls may be desirable, for example tilted side walls to obtain a cone-shaped opening. In the embodiments described in FIGS. 6 and 7 in addition to the openings 106 the wafer 100 may further be pre-processed to define pre-structured dicing cavities or grooves to reduce volume to be removed during dicing ("=dicing reliefs") wherein the wafer is surrounded by a solid glass supporting ring without such dicing cavities.

In accordance with further embodiments of the invention, aperture (="opening in a non-transparent surface") structures may be provided. While in conventional approaches such aperture structures are provided on the glass substrate underlying the lens structure, this is no longer possible in accordance with the teachings of the invention. Therefore the aperture structures may be provided on the lens structure itself, for example by a photolithographic process or by a lift-off process. Additionally, it might be desired to provide further non-transparent spacer wafers having a defined aperture and providing at the wafer having the cavity above which the lens structure is arranged. Alternatively, very thin glass wafers or polymer sheets having aperture structures may be provided, wherein these aperture structures are advantageously generated by lithographic processes. The thickness of the glass wafer or polymer sheet in such an embodiment may be 0.01-1 times the thickness of the substrate or may be in the range of 10 μm to 1000 μm (or two laminated/bonded half-thickness glass/polymer plates with apertures in between) to avoid undesired distortions by this additional glass element.

In the embodiments described above, the side walls of the holes were perpendicular to the substrate surface. However, also other shaped side walls may be desirable, for example tilted side walls to obtain a cone-shaped opening.

In accordance with another embodiment so-called "catch grooves" are provided in the substrate, wherein the catch grooves are provided to receive excess lens material. For example, in the above Figs. a ring-shaped groove may be provided around the recess in the substrate/wafer 100 which is dimensioned such that its volume is sufficient to receive excess lens material which is applied due to the tolerances with which a dispenser applies the lens material to the substrate/wafer.

While specific lens profiles where described above it is to be noted that the invention is not limited to the illustrated lens profiles. Rather, any desired lens profile may be generated by means of the inventive process as described above resulting in a "free-hanging" lens structure of desired shape above an opening or recess in a support layer. For example, the lens profiles may be selected from the group comprising plano convex lenses, plano concave lenses, bi-convex lenses, bi-concave lenses and meniscus lenses with any spherical, conical, aspherical—and/or combination of those—description of the lens surface/profile.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A method for manufacturing a lens comprising a lens portion, the method comprising:
    (a) providing a substrate comprising a recess, which defines a hole extending from a first surface of the substrate to a second surface of the substrate;
    (b) arranging the substrate and a first mold in contact with each other such that the substrate's recess and the first mold are aligned, wherein the first mold comprises a portion shaped in accordance with a first desired lens surface;
    (c) applying a sacrificial material to the substrate, into the recess and into the first mold, the sacrificial material comprising a shape in accordance with the first desired lens surface;
    (d) curing the sacrificial material;
    (e) removing the first mold;
    (f) applying a lens material to the substrate and to the sacrificial material so that the lens material comprises a shape in accordance with the first desired lens surface; and
    (g) removing the sacrificial material to provide the lens portion.

2. The method of claim 1, wherein the first mold is shaped such that the sacrificial material is applied at a portion of the first surface of the substrate.

3. The method of claim 1, wherein
    the first mold is arranged at the second surface of the substrate, and
    the sacrificial material is applied from the first surface of the substrate into the mold and into the hole so as to at least partly fill the hole but to completely fill the mold to define the first desired first lens surface.

4. The method of claim 1, wherein
    applying the lens material in (f) comprises shaping a first side thereof in accordance with the shaped sacrificial material, and
    (f) further comprises shaping a second side of the lens material opposite to the first side in accordance with the second desired lens surface.

5. The method of claim 4, further comprising:
arranging the substrate and a second mold such that the second mold and the shaped sacrificial material are aligned, wherein the second mold comprises a shape in accordance with the second desired lens surface.

6. The method of claim 5, wherein the lens material is applied before or after arranging the second mold at the substrate,
wherein in case of applying the lens material after arranging the second mold at the substrate,
the substrate and the second mold are arranged with a distance there between defined by the desired lens profile, and
in (f) the lens material is introduced into the space between the substrate comprising the shaped sacrificial material and the second mold, and
wherein in case of applying the lens material before arranging the second mold at the substrate,
the second mold is arranged on the lens material to shape the lens material in accordance with the desired lens profile.

7. The method of claim 1, wherein
(f) comprises curing the lens material, and
(g) comprises dissolving the sacrificial material.

8. The method of claim 1, wherein the substrate is a wafer comprising a plurality of recesses.

9. The method of claim 8, comprising:
masking a portion of the lens material between adjacent recesses prior to curing the lens material; and
removing the unmasked portions of the lens material.

10. A lens, comprising:
a lens structure of a lens material, the lens structure comprising a support portion and a lens portion comprising a first desired lens surface and a second desired lens surface; and
a substrate comprising a recess in a first surface of the substrate,
wherein the lens structure is arranged at the substrate such that the lens structure's support portion is attached to the first surface of the substrate and such that the lens structure's lens portion is aligned with the substrate's recess, the lens portion being manufactured in accordance with a method for manufacturing the lens comprising the lens portion, the method comprising:
(a) providing the substrate comprising the recess, which defines a hole extending from the first surface of the substrate to a second surface of the substrate;
(b) arranging the substrate and a first mold in contact with each other such that the substrate's recess and the first mold are aligned, wherein the first mold comprises a portion shaped in accordance with the first desired lens surface;
(c) applying a sacrificial material to the substrate, into the recess and into the first mold, the sacrificial material comprising a shape in accordance with the first desired lens surface;
(d) curing the sacrificial material;
(e) removing the first mold;
(f) applying a lens material to the substrate and to the sacrificial material so that the lens material comprises a shape in accordance with the first desired lens surface; and
(g) removing the sacrificial material to provide the lens portion.

11. An optical system, comprising one or more lenses, comprising:
a lens structure of a lens material, the lens structure comprising a support portion and a lens portion comprising a first desired lens surface and a second desired lens surface; and
a substrate comprising a recess in a first surface of the substrate,
wherein the lens structure is arranged at the substrate such that the lens structure's support portion is attached to the first surface of the substrate and such that the lens structure's lens portion is aligned with the substrate's recess, the lens portion being manufactured in accordance with a method for manufacturing the lens comprising the lens portion, the method comprising:
(a) providing the substrate comprising the recess, which defines a hole extending from the first surface of the substrate to a second surface of the substrate;
(b) arranging the substrate and a first mold in contact with each other such that the substrate's recess and the first mold are aligned, wherein the first mold comprises a portion shaped in accordance with the first desired lens surface;
(c) applying a sacrificial material to the substrate, into the recess and into the first mold, the sacrificial material comprising a shape in accordance with the first desired lens surface;
(d) curing the sacrificial material;
(e) removing the first mold;
(f) applying a lens material to the substrate and to the sacrificial material so that the lens material comprises a shape in accordance with the first desired lens surface; and
(g) removing the sacrificial material to provide the lens portion.

12. The optical system of claim 11, wherein dependent from a desired optical characteristic of the optical system the lens profile and the substrate thickness of each of the plurality of lenses are selected, and wherein the lenses are stacked and stacked with the image sensor.

* * * * *